United States Patent [19]

Wilson et al.

[11] Patent Number: 5,154,076
[45] Date of Patent: Oct. 13, 1992

[54] DYNAMOMETER FOR SIMULATING THE INERTIAL AND ROAD LOAD FORCES ENCOUNTERED BY MOTOR VEHICLES

[75] Inventors: Jack A. Wilson, West Covina; Hubert M. Walker, San Marino, both of Calif.

[73] Assignee: Clayton Industries, El Monte, Calif.

[21] Appl. No.: 652,950

[22] Filed: Feb. 8, 1991

[51] Int. Cl.⁵ .......................................... G01M 15/00
[52] U.S. Cl. ........................................................ 73/117
[58] Field of Search .................................. 73/117, 125

[56] References Cited

U.S. PATENT DOCUMENTS 4,161,116  7/1979  Fegraus et al.
4,324,133  4/1982  Stevenson.

OTHER PUBLICATIONS

Roy F. Knudsen, *Inertia-Electronically*, ISA Journal, vol. 5, No. 4, Apr. 1958, pp. 52-54.
S. D'Angelo and R. D. Gafford, *Feed-Forward Dynamometer Controller for High Speed Inertia Simulation*, SAE, Jun. 8-12, 1981, Introduction and Installation Manual for Clayton Dynamometer Model No. C-4-8-24.

*Primary Examiner*—Robert Raevis
*Attorney, Agent, or Firm*—Harold L. Jackson

[57] ABSTRACT

A dynamometer for simulating the inertia and road load forces for motor vehicles is described. The dynamometer includes a moveable frame on which is mounted one or more rolls for engaging the driven wheel or wheels of the test vehicle, a power supplying and/or absorbing unit such as an electric motor and one or more mechanical flywheels. The moveable frame is pivotally mounted about the axis of rotation of the rolls. A force transducer is disposed between a point on the moveable frame spaced from the roll axis and a stationary surface for measuring a force which includes as components thereof the roll/wheel interface force and a force associated with the roll, motor and flywheel parasitic losses. A velocity transducer measures the roll speed. A controller responsive to signals from the force and velocity transducers and to the selected simulated inertia and road load controls the motor to supply power to or absorb power from the rolls so that the force applied to or received from the vehicle wheels is proportional to the selected simulated inertia and road load.

40 Claims, 4 Drawing Sheets

DYNAMOMETER FOR SIMULATING THE INERTIAL AND ROAD LOAD FORCES ENCOUNTERED BY MOTOR VEHICLES

BACKGROUND OF THE INVENTION

1. Field of the Invention

This invention relates to dynamometers for simulating the inertia and road load forces encountered by motor vehicles under anticipated driving conditions and more particularly to a dynamometer which eliminates the need to compensate for certain unmeasured equipment parasitic losses inherent in the dynamometer's operation.

2. Description of the Prior Art

Dynamometers are often used in testing motor vehicles such as automobiles, trucks, motorcycles etc. where in situ operation is desired. Since the test vehicles are not moving over a road bed, the dynamometer must simulate certain forces normally associated with actual vehicle operation. These parameters include forces associated with inertial forces (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by the formula:

$$RL = A + BV + CV^n + D$$

where A, B and C represent the effects of breakaway force, rolling friction and windage, V represents velocity, D represents the grade of the slope and n is the exponent to which the velocity V is raised.

The purpose of the dynamometer is to impose those forces on the vehicle which the vehicle would incur during actual operation on a road. Such dynamometers include a roll (or a pair of rolls) for engaging the driven wheel (e.g., motorcycle) or wheels (e.g., automobile) of the vehicle being tested. The roll or rolls are supported by a shaft journaled in bearings mounted on a frame.

Typically a power absorber such as a friction brake, eddy current brake or hydrokinetic brake carried by the same or a different frame is coupled to the roll for absorbing power from the roll which in turn applies a retarding force to the surface of the vehicle wheel (e.g., tire) to simulate the road load forces. Inertial forces can also be simulated by such power absorbers during acceleration but not during deceleration since such units absorb but do not supply power. Generally where such power absorbers ("power absorbing units") are used, the inertial forces are simulated by selectively coupling the roll to one or more mechanical flywheels. The combined inertia of the flywheels and the roll (as well as the absorber) exert force on the vehicle wheels proportional to the acceleration (or deceleration) of the vehicle wheels. Thus, the engine is required to expend as much power in accelerating the roll as it does in overcoming the vehicle inertia during actual road acceleration. The use of flywheels alone to accurately simulate inertia for a variety of vehicles is limited by the number and size of flywheels available. The larger the number of flywheels the greater the cost and complexity of the dynamometer.

Electric motors have the capability of supplying as well as absorbing power and for this reason have been used to simulate both vehicle inertia and road load forces. One or several flywheels may be used in conjunction with such motors ("power supplying and absorbing units") to minimize the size of the motor required and therefore the cost of the resulting dynamometer, its installation and operation. Vehicle speed and acceleration may be computed from the formula:

$$V_1 - V_0 = \int_{t_0}^{t_1} \frac{F - RL}{I} dt$$

where $V_1$ = computed velocity at time $t_1$, $V_0$ = the velocity at time $t_0$, F = the measured force at the wheel/roll interface, and I = the simulated vehicle inertia and RL = road load force.

To control a power supplying and/or absorbing unit accurately, it is necessary, therefore, to measure V (representative of the vehicle velocity) and F (representative of the force at the wheel/roll interface). A dynamometer controller responsive to signals (e.g., electrical) representing V and F and the inertia and road load forces to be simulated supplies the appropriate control signals to the power supplying and/or absorbing unit.

The rotational velocity of the roll is representative of V and can be accurately measured by coupling a speed encoder of the optical or magnetic pulse type to the dynamometer roll. However, there is no force measuring device which as a practical matter, can be placed between the rotating vehicle wheel and the roll. As a compromise, typical prior art dynamometers have placed a force measuring device or transducer ("load cell") either at the output of the power supplying and/or absorbing unit or between the flywheel assembly and the shaft connecting the flywheels to the roll. In either case, there are bearing friction and windage losses generated by the roll and/or flywheels which are not measured by the load cell. Such losses are commonly referred to as parasitic losses and must be compensated for in order to provide an accurate control signal for the dynamometer.

A parasitic loss profile or curve of the lost force at the roll surface versus roll speed for the roll (and any other components such as flywheels located between the load cell and the roll shaft) can be computed by measuring the force required to maintain the roll at several selected (e.g., three) speeds. Such a loss profile can also be calculated by using the actual inertia of the roll system and allowing the roll to coast down from a high speed while measuring the change of roll speed at selected points on the speed curve. A signal representative of the parasitic losses can then subtracted from the control signal fed to the dynamometer. However, the accuracy of such prior art dynamometers is limited by the fact that parasitic losses and particularly frictional losses can vary with temperature, wear and other factors.

U.S. Pat. No. 4,324,133, assigned to the assignee of this application, describes a torque measuring device for dynamometers in which the roll is mounted on linkage pivotally attached to a fixed frame. A power absorber is also mounted on the fixed frame and coupled to the roll through a shaft and gear box. A load cell is connected between the linkage and the fixed frame. While the load cell in such an arrangement will sense the parasitic losses which occur within the roll bearings and gear box, it will not account for the force associated with the slippage between the gear box and the spline which connects the gear box to the absorber.

Thus, there is a need for a dynamometer which is arranged so that the forces accompanying the parasitic losses of the roll, power supplying and/or absorbing unit and the coupling therebetween is included in the value measured by the force sensing means to thereby eliminate the need to compensate for such losses.

SUMMARY OF THE INVENTION

In accordance with the present invention a dynamometer for simulating the inertia and road load forces for motor vehicles includes at least one roll adapted to engage at least one driven wheel of the vehicle. A moveable frame rotatably supports the roll about a lateral axis (i.e., lateral to the longitudinal axis of the vehicle). The moveable frame is pivotally mounted about the lateral axis relative to a stationary surface. A power supplying and/or absorbing device such as a d.c. or a.c. motor (supplier and absorber) friction brake (absorber) etc. is carried by the moveable frame and coupled to the roll for supplying power to and/or absorbing power from the roll. The roll in turn applies a force to or receives a force from the wheel proportional to the supplied or absorbed power.

A force transducer is coupled between the moveable frame and the stationary surface for providing a measure of the force applied to or received from the vehicle wheel, the measured force including the force accompanying the parasitic losses of the rotating roll, the power supplying and/or absorbing unit and the coupling therebetween. A speed transducer is provided to measure the roll speed. Control means e.g., a dynamometer controller, responds to the force and speed measurements and controls the power supplying and/or absorbing unit to supply power to or absorb power from the roll so that the force applied to or received from the wheel is proportional to a selected simulated inertia and road load for the vehicle under test.

The features of the present invention can be best understood by reference to the following description taken in conjunction with the accompanying drawings wherein like reference numerals indicate like components.

DESCRIPTION OF THE PREFERRED EMBODIMENT

Figure 1:
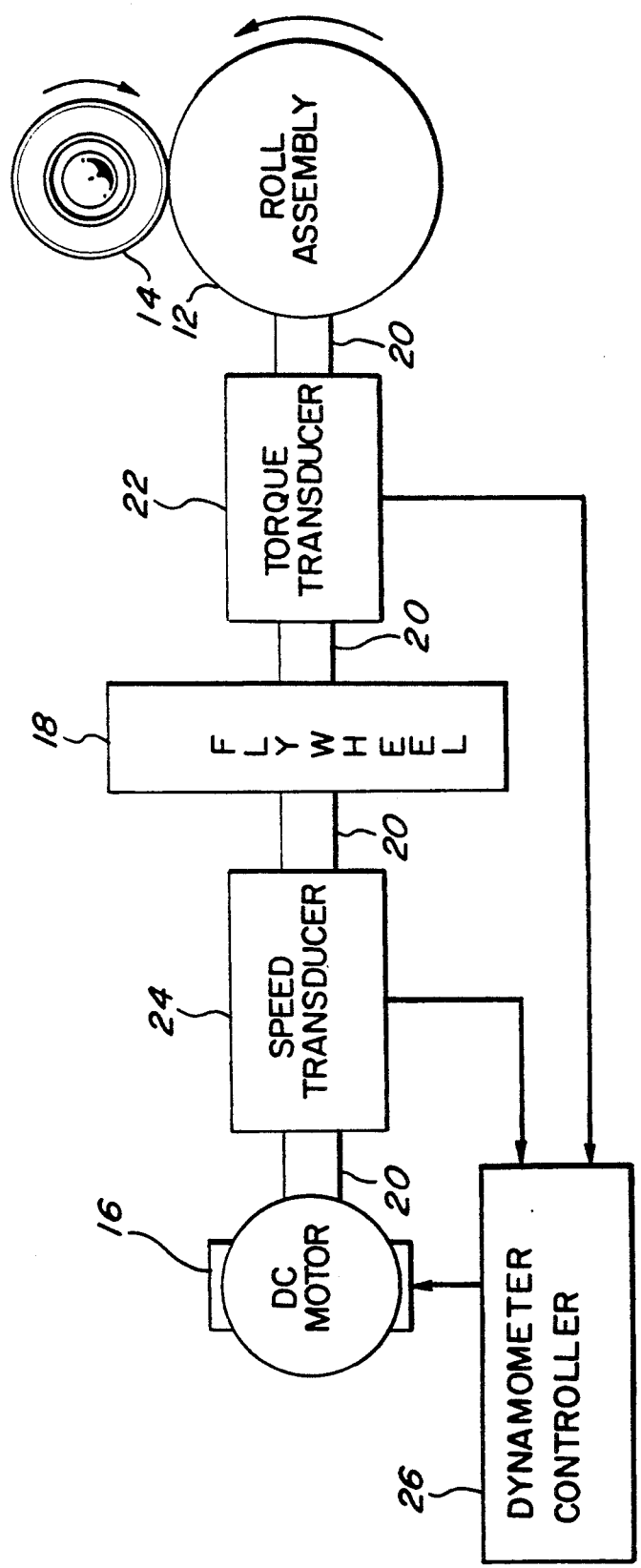
FIG. 1 is a block diagram of a typical prior art dynamometer in which a transducer for providing a measure of the tire/roll force F is located between the roll and motor/flywheel assembly.

Referring now to the drawings and particularly to FIG. 1, there is shown a block diagram of a typical prior art dynamometer for simulating inertial and road load forces. The dynamometer has a roll assembly (one or two rolls) 12 for engaging the driven wheel 14 or wheels of the vehicle being tested. A power supplying and absorbing unit 16 in the form of an electric motor (i.e., d.c.) and a mechanical flywheel 18 is connected to the roll assembly via a shaft 20. A torque transducer 22 measures the torque transmitted to the flywheel 18 and motor 16 from the roll assembly 12 and vice versa. A speed transducer or velocity encoder 24 provides a measure of the rotational velocity of the shaft 20 and roll assembly 12. A dynamometer controller 26 receives torque and speed signals from transducers 22 and 24 and provides control signals to the motor to cause it to supply power to or absorb power from the shaft 20 proportional to the simulated inertia and road load forces for the vehicle being tested. The controller can be designed to differentiate the speed signal (a slowly varying parameter) to compute acceleration for controlling the torque of the motor (providing a slow response time) for inertia simulation and road load. Preferably the controller can be designed to integrate the measured force signal (rapidly varying parameter) and compute a speed signal which is used to control the speed of the motor (providing a fast response time) for inertia simulation and road load. The latter technique is described in detail in U.S. Pat. No. 4,161,116 assigned to the assignee of this application.

Regardless of the control technique, the prior art dynamometer of FIG. 1 must compensate for the bearing friction and windage losses in the roll assembly which losses will vary with conditions such as temperature, wear, etc.

Figure 2:
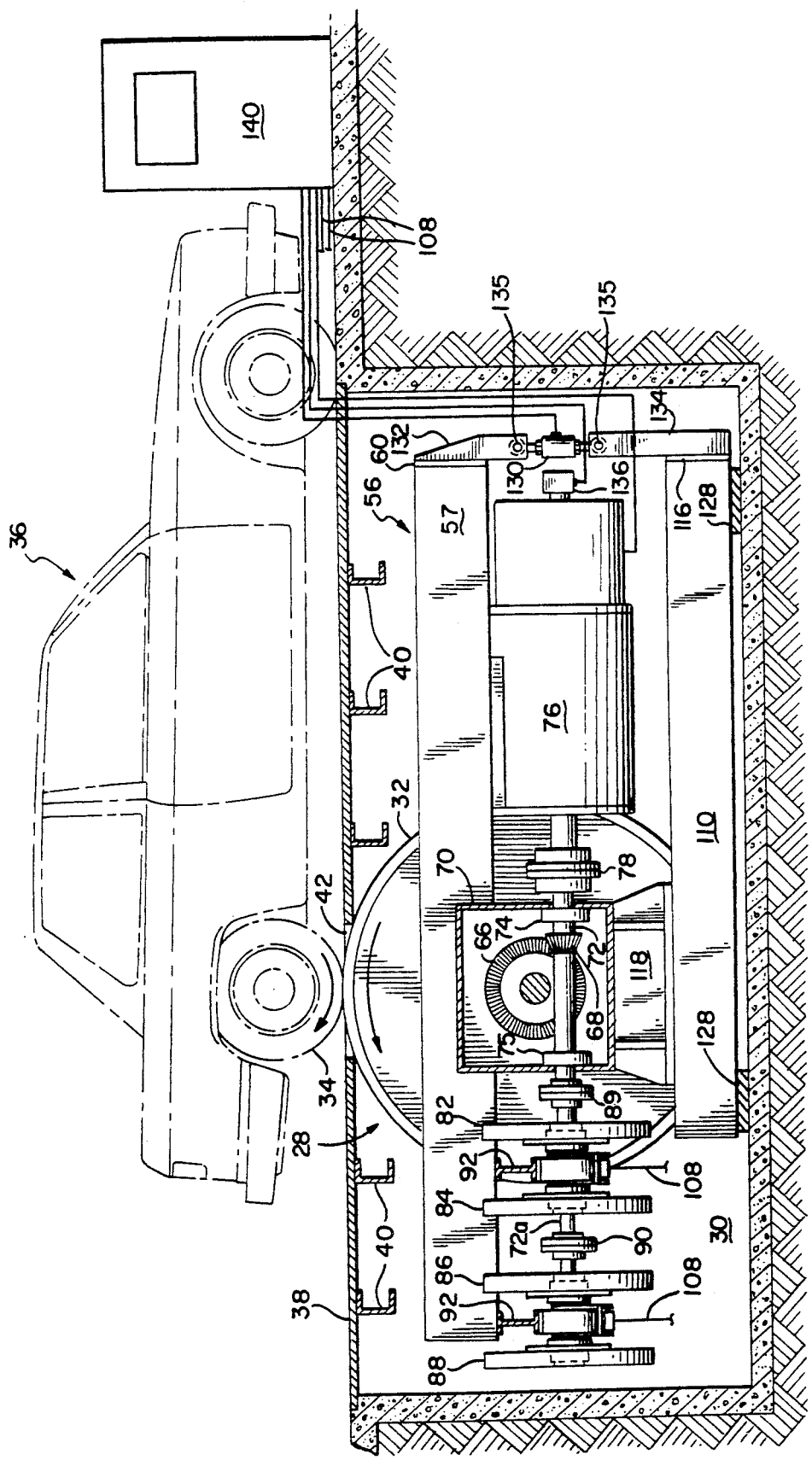
FIG. 2 is a diagrammatic elevational view, partially in cross section of a dynamometer in accordance with the invention.
Figure 3:
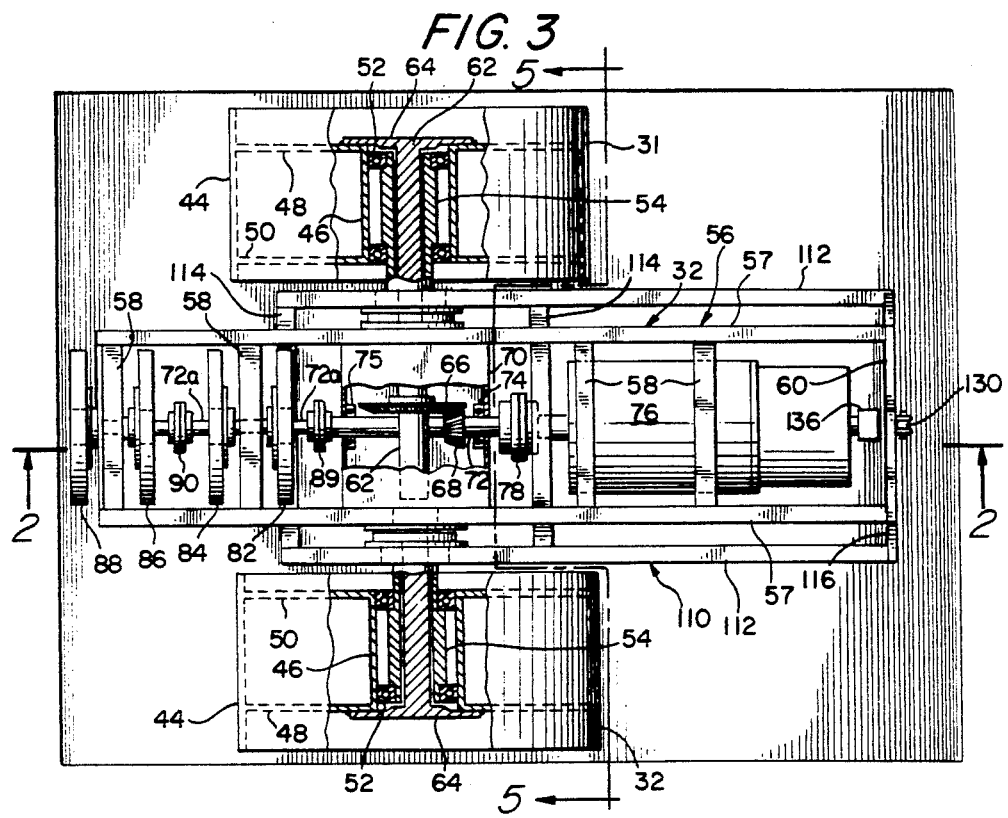
FIG. 3 is a top plan view partially broken away, of the dynamometer of FIG. 2.

Referring now to FIGS. 2 and 3, a preferred embodiment of a dynamometer 28 in accordance with our invention is positioned within a pit 30 and includes a pair of rolls 31 and 32 which are arranged to engage the driven wheels 34 of a motor vehicle 36. A metal plate 38 supported by channel sections 40 provides a cover for the dynamometer while allowing access to the rolls through opening 42 therein.

Figure 4:
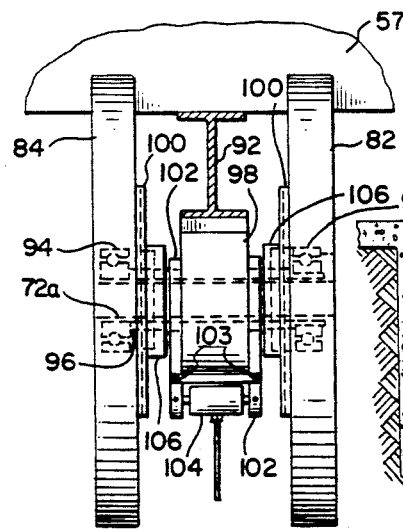
FIG. 4 is an enlarged elevational view of two of the flywheels of the dynamometer of FIG. 2 showing in more detail the flywheel bearing and clutch arrangement.

The rolls 31 and 32 are identical and comprise an outer rim 44, an inner hub 46 and radial supporting plates 48 and 50 as is illustrated in FIG. 3. The rolls 31 and 32 preferably have a diameter within the range of 36 to 60 inches and most preferably have a diameter of about 48 inches or 1220 mm so that the wheel/roll interface approximates actual road operation. Roll support bearings 52 are disposed between the hubs 46 and annular support members 54. The support members 54 are secured e.g. by welding, to a moveable frame 56. The frame 56 includes longitudinal channel members 57, supporting cross bars 58 and end plate 60 as is shown in FIG. 3. A roll drive shaft 62 includes end caps 64 which are secured, for example, by welding to the outer support plates 48 of the rolls so that the shaft 62 rotates with the rolls 31 and 32. The shaft 62 is aligned along an axis (lateral) which is perpendicular to the axes of the longitudinal channel frame members 57 and parallel to the axis of rotation of the vehicle wheels. A ring gear 66 is carried by the shaft 62 and mates with a pinion gear 68 disposed within a gear box 70 mounted on the moveable frame 56. The pinion gear 68 is carried by a pinion shaft 72 aligned along a longitudinal axis and supported by gear box bearings 74 and 75. A power supplying and absorbing unit in the form of an electric motor (d.c. or a.c.) 76 is mounted on the moveable frame 56 and coupled to the pinion shaft 72 through a coupling 78. Four flywheels, 88, 82, 84 and 86 are also carried by the moveable frame 56 and disposed on the side of the drive shaft 62 remote from the electric motor 76 so that the frame 56 is substantially balanced about the lateral axis in the absence of force being applied to the rolls 31 and 32. The flywheels are arranged to be selectively coupled to the pinion shaft via couplings 89 and 90 and clutch mechanisms to be described. Each flywheel may simulate 125 to 4000 pounds of equivalent vehicle weight or more depending upon the maximum inertia to be simulated by the flywheels alone. The details concerning the flywheel mounting and clutching mechanisms are illustrated in FIG. 4. Two I beams 92 for supporting the four flywheels are secured, e.g. by welding, to the longitudinal channel members 57 of the moveable frame 56 and positioned under the two cross bars 58 remote from the motor 76. See FIGS. 2 and 4. One I beam for supporting two of the flywheels (i.e. 82 and 84) is illustrated in FIG. 4. Each flywheel is mounted via a bearing 94 on an annular support stub 96 carried by a flywheel support bracket 98 which in turn is secured to the bottom of a respective I beam 92. Conventional clutch plates (not shown) are disposed within a clutch housing 100. A pair of clutch actuating arms 102 are pivotally mounted to the bottom of the flywheel support bracket 98 by pins 103 and carry conventional throw-out bearings (not shown) in the upper portions thereof. An electrical or pneumatic actuating unit 104 causes one or both of the arms 102 to force pressure plates 106 against the disc plates located within the housings 100. One of the disc plates is splined to the pinion shaft extension 72a and the other mating disc plate is secured to the flywheel so that actuation of the unit 104 via a signal on line 108 engages one or both flywheels with the shaft.

Figure 5:
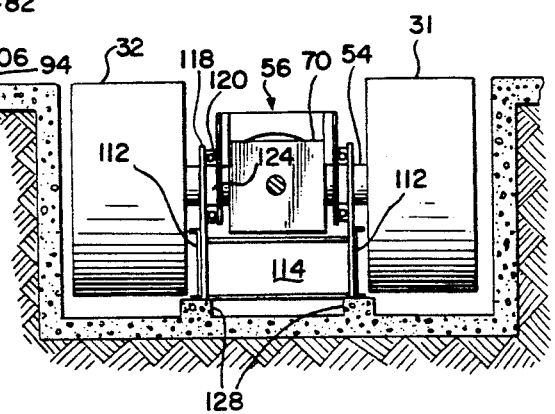
FIG. 5 is a view taken along lines 5—5 of FIG. 3.

Referring again to FIGS. 2 and 3, the moveable frame 56 is pivotally mounted on a stationary frame 110 to allow a force sensing device such as a load cell to provide a measure of the vehicle wheel/roll force plus a force associated with the parasitic losses of the rotating roll, motor and flywheels, as will be explained in more detail. The stationary frame 110 includes longitudinal channel members 112, cross bars 114 and end plate 116. A pair of truncated support brackets 118 extend upwardly from the stationary frame 110 as is illustrated in FIGS. 2 and 5. The brackets 118 support the outer races 120 of bearings 122. The inner races 124 of the bearings 122 are mounted to the moveable frame via the annular support members 54. The stationary frame is mounted on the floor of the pit 30 via pads 128.

As is shown in FIG. 2, a conventional force measuring transducer or load cell 130 is mounted between the moveable and stationary frames. A pair of load cell support brackets 132 and 134 (secured to the end plates 60 and 116 of the moveable and stationary frames, respectively) support the load cell through spherical bearing rod ends 135 to allow the load cell to accommodate a slight accurate movement of the bracket 132 when the moveable frame pivots about the lateral axis due to a force being applied to the rolls. When force is applied to the surface of the rolls by the vehicle wheels (e.g. during acceleration) the moveable frame 56 will pivot about the lateral axis (concentric with the drive shaft 62) and tend to lift the end plate 60 thereby applying a tensile force to the load cell. By the same token, when the rolls are applying a force to the vehicle wheels (i.e. during deceleration) the end plate 60 of the moveable frame will tend to lower thereby applying a compressive force to the load cell The actual movement of the end plate 60 will be very small e.g. of the order of only a few thousands of an inch.

A velocity sensor 136, in the form of a conventional optical speed or magnetic pulse encoder, is coupled to the motor shaft for providing a measure of the roll or vehicle wheel speed A dynamometer controller 140 (mounted adjacent the pit 30 as is shown in FIG. 2) receives signals from the velocity sensor and load cell. The controller is also connected to the flywheel clutch actuating units 104 via leads 108 and to the motor as is illustrated in FIG. 2. The controller includes means (e.g. stored data and selection switches, not shown) to allow an operator to select the inertia and road load forces to be simulated for the vehicle under test The controller also includes a data processing unit for providing a control signal to the motor 76 to cause the motor to absorb power from or supply power to the rolls in accordance with the force necessary to (1) simulate the vehicle inertia and road load for the vehicle and (2) counteract the dynamometer parasitic losses.

In operation, a vehicle to be tested is positioned over the test pit 30 so that its driven wheels engage the rolls 31 and 32 as illustrated in FIG. 2. Chains may be used to hold the vehicle in place. The test vehicle inertia and road load forces maybe selected from data stored in the controller 140. The controller may activate one or more of the flywheel clutch actuating units 104 depending upon the selected inertia. The vehicle engine is then operated in accordance with a desired test sequence while the data process portion of the controller receives signals from the load cell 130 and the speed sensor 136 and controls the motor 76 in accordance with the formula:

$$V_1 - V_0 = \int_{t_o}^{t_1} \frac{F - RL}{I} dt$$

where V = velocity, F = force at the roll surface and RL = road load as discussed above.

The computed velocity $V_1$ may be compared with the measured velocity from the velocity sensor 136 to provide an error signal which is then used by the controller to control the motor to drive the error signal to zero as is explained more fully in U.S. Pat. No. 4,161,116. As an alternative, the controller 140 may utilize the measured speed signal from the sensor 136, compute acceleration (by differentiating the speed signal) and develop a calculated torque (or force) signal which is the compared with the actual torque (or force) signal experienced by the rolls and measured by the load cell 130 to develop an error torque signal for controlling the motor.

Since the load cell measures the force applied to or received by the rolls from the vehicle wheels plus the force accompanying the dynamometer parasitic losses the control signal supplied to the motor by the controller automatically takes the parasitic losses into account and eliminates the need to provide compensation for such losses. The only force which is not measured by the load cell is the very small fore inherent in the extremely small pivotal movement in the moveable frame support bearings 120, i.e. that annular movement associated with a few thousands of an inch movement at the load cell located some distance away from the lateral axis.

Figure 6:
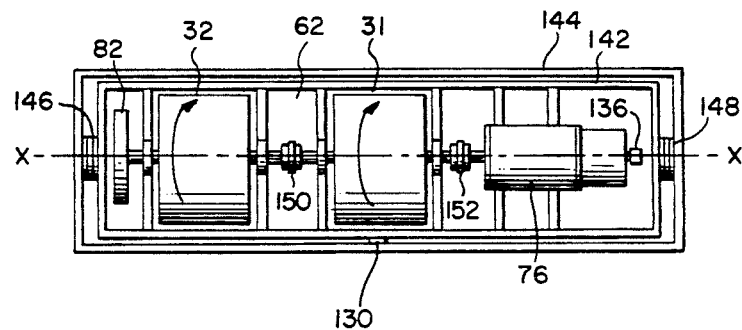
FIG. 6 is a schematic top plan view of another embodiment of the present invention.

Referring now to FIG. 6 there is illustrated another embodiment of the present invention. In this embodiment the moveable and stationary frames 142 and 144, respectively, are positioned along the rotational (lateral) axis x—x of the rolls 31 and 32. The electric motor 76 and the flywheels 82 etc. (only one of which is shown) are supported by the moveable frame and are also aligned along the lateral axis o that the rolls, frame, motor and flywheels are substantially balanced around that axis.

The moveable frame 142 is pivotally mounted on the stationary frame 144 about the lateral axis by suitable bearings 146 and 148. Couplings 150 and 152 are illustrated for interconnecting the rolls and the motor. A velocity sensor 136 is coupled to the motor shaft and a load cell 130 is positioned between the moveable and stationary frames. The load cell 130 may be arranged to receive either a tensile or a compressive force when the moveable frame pivots in a clockwise direction as illustrated by the arrows on the rolls and the opposite force when the frame pivots in counterclockwise direction. The net result is that the cell provides a measure of the force applied to or received from the roll by the vehicle wheels plus the force associated with the parasitic losses of the rotating roll, motor, flywheels and couplings.

The arrangement illustrated in FIG. 6 requires that the test pit holding the dynamometer extend beyond the sides of the vehicle being tested. This may be a disadvantage where a number of dynamometers are to be installed or where space is at a premium. Also, the absence of a gear reduction box in the embodiment of FIG. 6 will require the use of a larger d.c. or a.c. motor for the same power as compared with the embodiment of FIGS. 2-5. This latter disadvantage may be overcome, however, by placing a gear box between the motor and the rolls.

Figure 7:
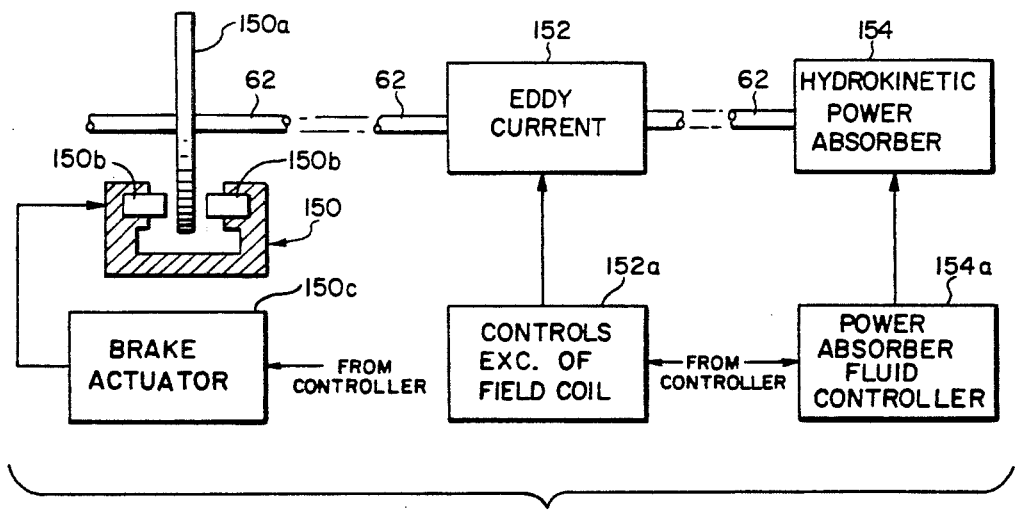
FIG. 7 is a block diagram of three power absorbers which may be used in place of the power supplying/absorbing unit illustrated in the embodiments of FIG. 1 and 6.

Referring now to FIG. 7 there is illustrated several types of power absorbers i.e. a mechanical friction brake 150, an eddy current brake 152, a hydrokinetic power absorber 154, which may be substituted for the electric motor 76 in the above embodiments where a portion of the inertia is to be simulated by the absorber only during acceleration. The mechanical friction brake 150 includes a rotating disc 150a coupled to the roll drive shaft 62 and a pair of brake pucks 150b which are forced against the disc by a conventional electromagnetic, hydraulic or pneumatic actuator 150c in response to the control signal from the controller 140.

The eddy current power absorption unit 152 may be of the conventional type, for example, of the type supplied by Dyamic Corporation of Kenosha, Wis. and described in that company's bulletin DB-1 published in November of 1953. In principle, an eddy current brake dynamometer absorbs power which varies with the excitation of the fluid coils ad speed. Field excitation for the coils will be supplied from the controller 140.

The hydrokinetic power absorber 154 may be of the type described in U.S. Pat. No. 2,870,875. In this type of absorber the absorbed power follows substantially a cubed curve with changes in speed and a given level of fill of working fluid such as water. A power absorber fluid controller 154a adds fluid to or removes fluid from the absorber in accordance with a control signal from the controller 10 in a manner well known to those skilled in the art to cause the absorber to increase or decrease the power being absorbed from the roll drive shaft.

There has been described a dynamometer for simulating the inertia and road load forces encountered by a motor vehicle during travel on the road in which the means for measuring the retarding or accelerating force on the vehicle wheel or wheels also measures the force attributable to parasitic losses within the dynamometer components. This eliminates the need to try and separately measure the force associated with such parasitic losses, thereby providing more accurate and reliable simulation of the inertia and road load forces.

Various modifications of the dynamometer arrangement will occur to persons skilled in the art. For example, a flexure bearing could be substituted for the pivot bearings 120 to further reduce the pivot point friction between the moveable and fixed frames. Where vehicles with more than one driven axle are to be tested two or more dynamometers could be located back-to-back in the test pit so that the rolls of each dynamometer engage the wheels of the driven axles. The stationary frame 110 may take the form of a stationary surface such as the bottom of the test pit with suitable means for mounting the moveable frame thereon These and other modifications are possible without involving any departure from the spirit and scope of our invention as set forth in the appended claims.

What is claimed is:

1. A dynamometer for simulating the inertia and road load for motor vehicles comprising:
   at least one roll adapted to engage at least one driven wheel of the vehicle;
   a moveable frame for rotatably supporting the roll about a lateral axis parallel to the axis of rotation of the wheel;
   means for pivotally mounting the moveable frame about the lateral axis relative to a stationary surface;
   a power supplying and/or absorbing unit carried by the moveable frame;
   means for coupling the power supplying and/or absorbing unit to the roll, the power supplying and/or absorbing unit being arranged to supply power to and/or absorb power from the roll, the roll applying a force to or receiving a force from the wheel in accordance with the supplied or absorbed power;
   force sensing means coupled between the moveable frame and the stationary surface for providing a measure of the force applied to or received from the vehicle wheel by the roll, the measured force including the force accompanying the parasitic losses of the rotating roll, the power supplying and/or absorbing unit and the coupling means;
   speed sensing means for providing a measure of the roll speed; and
   control means responsive to the roll speed and the force applied to or received from the vehicle wheel for controlling the power supplying and/or absorbing unit to supply power to or absorb power from the roll so that the force applied or received from the wheel is proportional to a force associated with a selected simulated inertia and road load for the vehicle.

2. The dynamometer of claim 1 including a stationary frame which forms the stationary surface on which the moveable frame is pivotally mounted.

3. The dynamometer of claim 2 wherein the moveable frame extends along an axis parallel to the lateral axis.

4. The dynamometer of claim 2 wherein the moveable frame extends along a longitudinal axis lying in a plane perpendicular to the lateral axis.

5. The dynamometer of claim 4 further including at least one flywheel mounted on the moveable frame and arranged to be selectively connected to the roll for rotation in synchronism therewith, the flywheel and the power supplying and/or absorbing unit being positioned on opposite sides of the lateral axis.

6. The dynamometer of claim 5 wherein the moveable frame, power supplying and/or absorbing unit and the flywheel are arranged so that the moveable frame is substantially balanced about the lateral axis in the absence of force being applied to the roll.

7. The dynamometer of claim 3 further including at least one flywheel mounted on the moveable frame and arranged to be selectively connected to the roll for rotation in synchronism therewith, the flywheel and the power supplying and/or absorbing unit being positioned along the lateral axis so that the moveable frame i substantially balanced in the absence of force being applied to the roll.

8. The dynamometer of claim 6 or 7 wherein said at least one roll comprises a pair of spaced rolls with a connecting shaft therebetween.

9. The dynamometer of claim 8 wherein the power supplying and/or absorbing unit is an electric motor.

10. A dynamometer for simulating the inertia and road load for motor vehicles comprising:
a stationary frame;
a moveable frame pivotally mounted on the stationary frame about a lateral axis;
at least one roll adapted to engage at least one vehicle wheel which is powered by the vehicle's motor, the roll being rotatably mounted on the moveable frame about a lateral axis, the lateral axis being parallel to the axis of rotation of the wheel;
a power supplying and/or absorbing unit secured to the moveable frame;
means for coupling the power supplying and/or absorbing unit to the roll, the power supplying and/or absorbing unit being arranged to supply power to and/or absorb power from the roll, the roll applying force to or receiving a force from the wheel in accordance with the supplied or absorbed power;
transducing means coupled between the moveable and stationary frames at a location spaced from the lateral axis for providing a measure of the force applied to or received from the vehicle wheel by the roll, the measured force including the force necessary to compensate for the force associated with the parasitic losses of the rotating roll, the power supplying and/or absorbing unit and the coupling means;
speed sensing means for providing a measure of the vehicle wheel speed; and
control means responsive to the vehicle wheel speed and the force applied to or received from the vehicle wheel for controlling the power supplying and/or absorbing unit to supply power to and/or absorb power from the roll so that the force applied to or received from the wheel is proportional to the force associated with a selected simulated inertia and road load for the vehicle.

11. The dynamometer of claim 10 wherein the stationary and moveable frames extend along longitudinal axes lying in a plane perpendicular to the lateral axis of rotation of the roll and wherein the power supplying and/or absorbing unit is positioned on one side of the lateral axis.

12. The dynamometer of claim 11 further including at lest one flywheel carried by the moveable frame and arranged to be selectively connected to the roll, the flywheel being positioned on the opposite side of the lateral axis from the power supplying and/or absorbing unit.

13. The dynamometer of claim 12 wherein the moveable frame, power supplying and/or absorbing unit and the flywheel are arranged so that the moveable frame is substantially balanced about the lateral axis in the absence of torque being applied to the roll.

14. The dynamometer of claim 13 wherein said at least one roll comprises a pair of spaced rolls with a connecting shaft therebetween and further including a right angle gear arrangement connected between the roll shaft, the power supplying and/or absorbing unit and the flywheel.

15. The dynamometer of claim 14 wherein the longitudinal axis lies in a plane which bisects the roll shaft midway between the rolls.

16. The dynamometer of claim 15 wherein the right angle gear arrangement includes gears to provide a different speed for the power supplying and/or absorbing unit and said at least one flywheel relative to the roll speed.

17. The dynamometer of claim 14 wherein the power supplying and/or absorbing unit is an electric motor, the motor being arranged, in response to the control means, to provide the necessary absorbing or motoring power to the roll so that the force between the roll and wheel precisely simulates the force associated with the inertia and road load for the vehicle being tested.

18. The dynamometer of claim 17 wherein the motor is a d.c. motor.

19. The dynamometer of claim 17 wherein the motor is an a.c. motor.

20. The dynamometer of claim 14 wherein the power supplying and/or absorbing unit is a friction brake.

21. The dynamometer of claim 14 wherein the power supplying and/or absorbing unit is an eddy current brake.

22. The dynamometer of claim 14 wherein the power supplying and/or absorbing unit is a hydrokinetic power absorber.

23. The dynamometer of claim 14 wherein the power supplying and/or absorbing unit comprises an electric motor and a unit which absorbs power only.

24. A dynamometer for simulating the inertia and road load for motor vehicles comprising:
a stationary frame;
a pair of spaced rolls, each roll being adapted to engage one of the driven wheels of the vehicle;
a shaft interconnecting the rolls to provide synchronous rotation thereof;
a movable frame having a longitudinal axis lying in a plane which bisects the shaft at right angles, the shaft being rotatably mounted on the moveable frame about a lateral axis;
an electric motor supported on the moveable frame on one side of the shaft and connected to the shaft for supplying power to or absorbing power from the shaft;

the moveable frame being pivotably mounted on the stationary frame about the lateral axis;

force sensing means coupled between the moveable frame and the stationary frame and spaced from the shaft for providing a measure of the force applied to or received from the vehicle wheels by the rolls and a measure of the force associated with the parasitic losses of the rotating components of the dynamometer;

speed sensing means coupled to the rolls for providing a measure of the vehicle wheel speed; and control means responsive to the vehicle wheel speed and the force applied to or received from the vehicle wheels for controlling the motor to supply power to or absorb power from the rolls so that the force applied to or received from the wheels is proportional to a selected inertia and road load for the vehicle being tested.

25. The dynamometer of claim 24 further including at least one flywheel supported on the moveable frame on the side of the shaft remote from the electric motor and arranged to be selectively coupled to the shaft for simulating at least a portion of the inertia of the vehicle, the flywheel, motor and moveable frame being arranged so that the moveable frame is substantially balanced about the lateral axis.

26. The dynamometer of claim 25 wherein said at least one flywheel comprises a plurality of flywheels with each flywheel being arranged to be individually coupled to the shaft.

27. The dynamometer of claim 26 further including a gear box connected between the shaft and the electric motor.

28. The dynamometer of claim 27 wherein the diameter of the rolls is within the range of 36" to 60".

29. The dynamometer of claim 28 wherein said at least one flywheel comprises a plurality of flywheels and each of said flywheels have a simulated vehicle weight within the range of 125 to 4000 pounds.

30. The dynamometer of claim 24 wherein the rolls have a diameter of about 48".

31. A dynamometer for simulating the inertia and road load forces for a vehicle comprising:

at least one roll adapted to engage a driven wheel of the vehicle;

a power supplying and/or absorbing unit;

means for coupling the power supplying and/or absorbing unit to the roll;

force measuring means for providing a measure of the force applied to or received from the roll by the vehicle wheel plus the force associated with the parasitic losses of the rotating roll, the power supplying and/or absorbing unit and the coupling means;

velocity sensing means for providing a measure of the roll speed; and control means responsive to the roll speed and the force measured by the force sensing means for controlling the power supplying and/or absorbing unit to supply power to or absorb power from the roll so that the force applied to or received from the wheel by the roll is proportional to a force associated with a selected inertia and road load for the vehicle.

32. The dynamometer of claim 31 wherein the force measuring means is located at a point spaced from the axis of rotation of the roll.

33. The dynamometer of claim 32 including a moveable frame for supporting the roll and power supplying and/or absorbing unit and means for pivotally mounting the moveable frame about the roll axis relative to a stationary surface.

34. The dynamometer of claim 33 wherein the force sensing means is connected between the moveable frame at a point spaced from the roll axis and the stationary surface.

35. The dynamometer of claims 34 further including at least one flywheel supported by the moveable frame and arranged to be selectively coupled to the roll, the moveable frame extending on both sides of the roll axis, the flywheel and power supplying and/or absorbing unit being positioned on opposite sides of the roll axis to balance the moveable frame about the roll axis in the absence of force being applied to the roll.

36. The dynamometer of claim 34 wherein the moveable frame extends along the roll axis.

37. The dynamometer of claim 36 further including at least one flywheel supported by the moveable frame and arranged to be selectively coupled to the roll, the moveable frame being balanced about the roll axis.

38. The dynamometer of claims 35 or 37 wherein the power supplying and/or absorbing unit is an electric motor.

39. The dynamometer of claim 38 wherein the electric motor is a d.c. motor.

40. The dynamometer of claim 38 wherein the electric motor is an a.c. motor.

* * * * *

UNITED STATES PATENT AND TRADEMARK OFFICE
CERTIFICATE OF CORRECTION

PATENT NO. : 5,154,076
DATED : Oct. 13, 1992
INVENTOR(S) : Wilson et al.

It is certified that error appears in the above-identified patent and that said Letters Patent is hereby corrected as shown below:

Column 5, line 16, after "alone." begin a new paragraph with "The".

Column 6, line 20, after "test" insert --.--.

Column 6, line 67, "fore" should read --force--.

Column 7, line 12, "o" should read --so--.

Column 7, line 68, "10" should read --140--.

Column 8, line 25, after "thereon" insert --.--.

Column 9, line 24, "i" should read --is--.

Signed and Sealed this

Fifth Day of April, 1994

Attest:

BRUCE LEHMAN

Attesting Officer

Commissioner of Patents and Trademarks